United States Patent [19]

Rees et al.

[11] Patent Number: 4,860,988
[45] Date of Patent: Aug. 29, 1989

[54] VERTICAL SEAT ADJUSTER APPARATUS AND METHOD

[75] Inventors: Richard W. A. Rees, Holland Landing, Canada; Mladen Humer, East Detroit, Mich.

[73] Assignee: General Motors Corporation, Detroit, Mich.

[21] Appl. No.: 135,801

[22] Filed: Dec. 21, 1987

[51] Int. Cl.⁴ ............................................ F16M 13/00
[52] U.S. Cl. ............................. 248/420; 248/188.4; 248/422; 297/348
[58] Field of Search ............... 248/420, 422, 396, 394, 248/371, 188.4, 157, 419, 354.3; 297/347, 348; 254/102

[56] References Cited

U.S. PATENT DOCUMENTS

| | | | |
|---|---|---|---|
| 1,472,388 | 10/1923 | Finch | 254/102 |
| 1,527,895 | 2/1925 | Mazoch | 248/422 X |
| 1,910,293 | 5/1933 | Jung | 248/157 |
| 2,070,468 | 2/1937 | Chapman | 248/422 X |
| 3,680,821 | 8/1972 | Barriere | 248/419 X |
| 4,655,426 | 4/1987 | Von Dulong et al. | 248/422 X |

FOREIGN PATENT DOCUMENTS 2001501  4/1972  Fed. Rep. of Germany ...... 248/394

Primary Examiner—Blair M. Johnson
Assistant Examiner—David L. Talbott
Attorney, Agent, or Firm—Ernest E. Helms

[57] ABSTRACT

The present invention provides an apparatus and method of utilization thereof of a seat adjuster with a vertical height adjustment mechanism. The seat adjuster has a vertically fixed support. Pivotally mounted to the support is an interior threaded sleeve. Projecting through the sleeve is a rod connected with the seat with threads of an opposite hand of the sleeve. Interposed between the rod and the sleeve is a knob which is threadably engaged with both the sleeve and the rod. Rotation of the knob causes the knob to have relative motion with respect to the sleeve and the rod to have relative motion with the sleeve to set the elevation of the seat. The present inventive vehicle seat adjuster is particularly useful in tri-mount vehicle type seating.

7 Claims, 3 Drawing Sheets

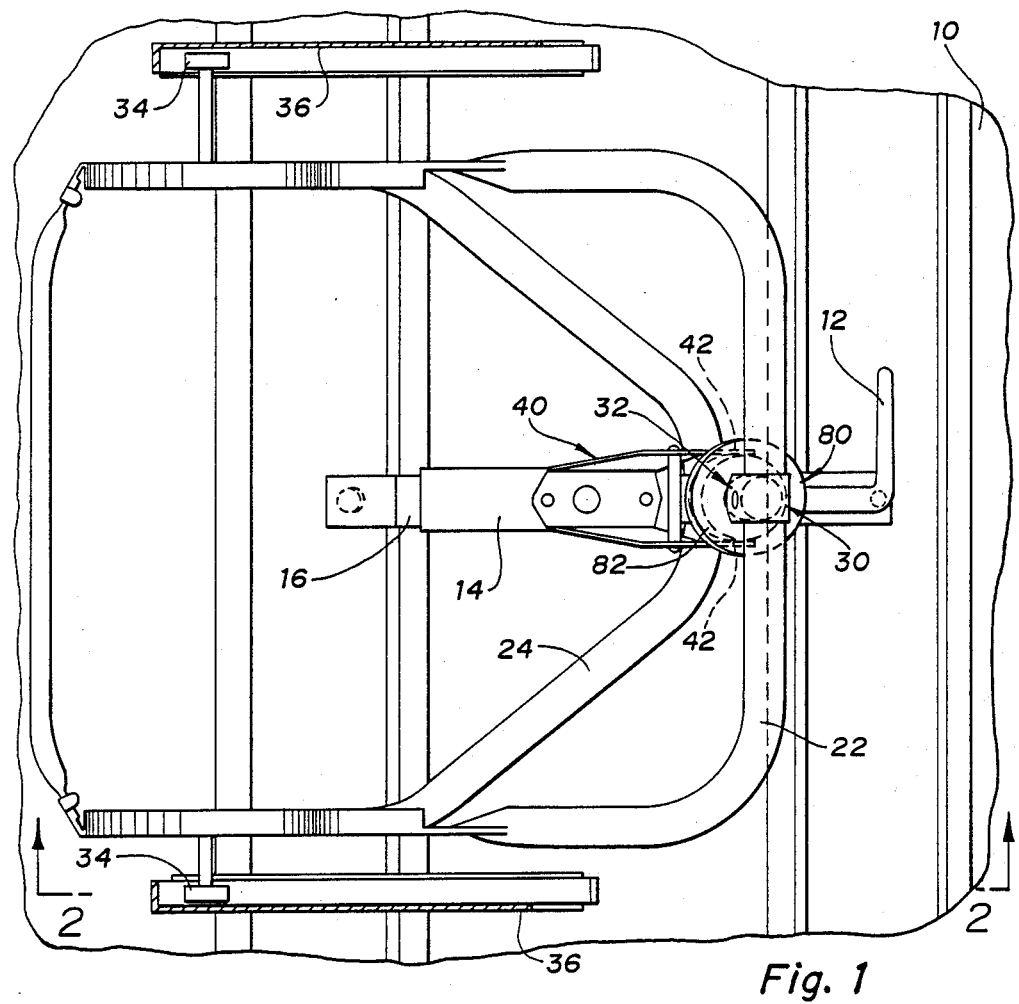
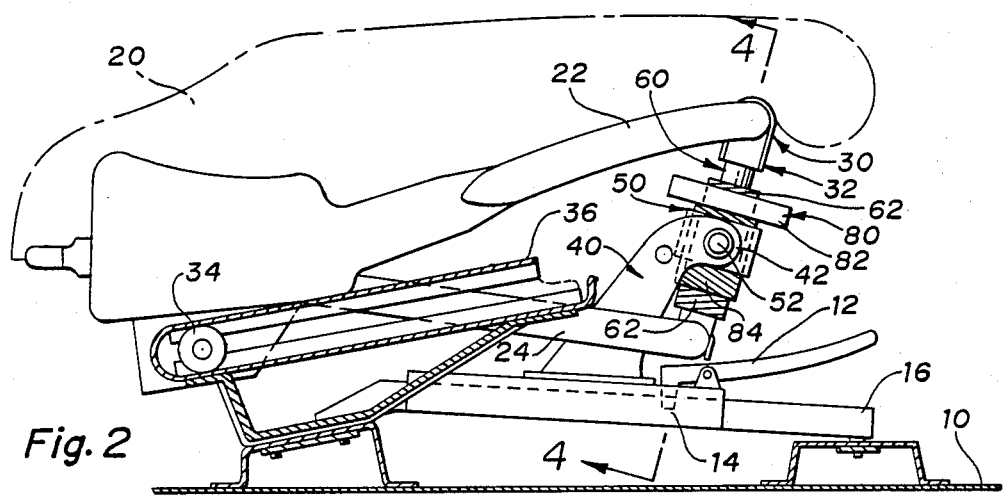

VERTICAL SEAT ADJUSTER APPARATUS AND METHOD

FIELD OF THE INVENTION

The field of the present invention is that of manual vehicle seat adjusters. More particularly, the field of the present invention is that of manual seat adjusters for tri-mount vehicle seats.

DISCLOSURE STATEMENT

Many tri-mount vehicle seats have a central front vertical support fixed with an upper channel. The upper channel is adjustably mounted fore and aft on a lower channel fixed to the floor of the vehicle. A latch mechanism fixes the position of the upper channel with the lower channel. The seat also has two rearward supports connected with rollers. The rollers are slidably mounted in a pair of lower channels which laterally flank the lower channel of the front support. The tri-mount vehicle sea is advantageous in that it only requires one latch mechanism and also in that it provides for improved aesthetics allowing the adjustment mechanism of the vehicle seat to be more easily hidden from view. Additionally, the tri-mount seat can provide more space for the rear seat occupants feet.

An excellent example of a tri-mount seat is provided by the disclosure of Wize, U.S. Pat. No. 4,432,524, commonly assigned. It is desirable to provide a seat adjuster similar to Wize which also includes means to adjust the height of the seat, typically the forward end. It is desirable that such an adjustment mechanism be simple in operation and in the assembly of parts, yet be sturdy enough to take the loading of the vehicle seat. It is also desirable that the adjustment mechanism be as light as possible.

SUMMARY OF THE INVENTION

To meet the above-noted and other desires the present invention is brought forth. The present invention provides a seat adjuster with a vertical adjustment mechanism which is particularly adaptable for tri-mount vehicle type seating. The seat adjuster includes a support which is fixed vertically and an interior threaded sleeve which is pivotally mounted with respect to the support. Projecting through the support is a rod which is exteriorly threaded in the opposite hand of the threads of the sleeve. The rod is also connected with the vehicle seat. Encircling the rod and inserted within the sleeve is a knob having interior and exterior threads engaged with the rod and sleeve respectively. Rotation of the knob causes the knob to have relative linear movement in a first direction with respect to the sleeve and causes the rod to have relative linear movement in the first direction with respect to the knob thereby adjusting the elevation of the seat.

It is an object of the present invention to provide an apparatus and method of utilization thereof of a vertically adjustable vehicle seat adjuster.

It is an object to provide a vehicle manual seat adjuster for setting the elevation of a vehicle seat pivotally mounted with respect to the vehicle, the adjuster including a support vertically fixed with respect to the vehicle with means of connection with the vehicle, an interior threaded sleeve pivotally mounted with respect to the support, an exterior threaded rod with threads of an opposite hand of the sleeve threads, the rod being connected with the seat and projecting through the sleeve, and a knob having interior threads encircling and engaged with the rod and the knob having exterior threads projecting into and engaged with the sleeve whereby rotation of the knob causes the knob to have relative linear movement with respect to the sleeve in a first direction and causes the rod to have relative linear movement with respect to the knob in the first direction to set the elevation of the seat.

It is another object of the present invention to provide a vehicle manual seat adjuster for setting the elevation of a tri-mount vehicle seat pivotally mounted with respect to the vehicle, the adjuster in combination comprising, a support vertically fixed with respect to the vehicle with means of connection with the vehicle, an exterior threaded sleeve pivotally mounted with respect to the support, an exterior threaded rod with threads of an opposite hand of the sleeve threads at an angle between 16° and 20°, the rod being connected with the seat and the rod projecting through the sleeve, a knob having interior threads encircling and engaged with the rod and the knob having exterior threads at an angle between 20° and 24° projecting into and engaged with the sleeve allowing the knob to freely rotate when the rod is acted upon by an axial force, and the knob having a portion with a series of slots, and a handle biased into a position of engagement with the slots of the knob and being selectively operable to a position of nonengagement with the knob whereby the handle in the nonengaging position allows the knob to rotate and have relative linear movement with the sleeve in a first direction and to cause the rod to have relative linear movement with the knob in the first direction to set the elevation of the seat and the handle in the engaging position with the knob prevents rotation of the knob thereby holding the desired elevation of the seat.

It is yet another object of the present invention to provide a method of setting the elevation of a vehicle seat pivotally mounted with respect to the vehicle, the method including, pivotally mounting an interior threaded sleeve with a support vertically fixed with respect to the vehicle, projecting through the sleeve an exterior threaded rod having threads opposite the sleeve threads, connecting the threaded rod with the vehicle seat, encircling the rod with a threadably engaged knob and projecting into the sleeve the knob and engaging exterior threads of the knob with the sleeve whereby rotation of the knob causes the knob to have relative linear movement with the sleeve in a first direction and causes the rod to have relative linear movement with the knob in the first direction and to set the elevation of the seat.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a top sectional view mainly in top plan of a preferred embodiment seat according to the present invention;

FIG. 2 is a view taken along line 2—2 of FIG. 1;

DETAILED DESCRIPTION OF THE DRAWINGS

Figure 3:
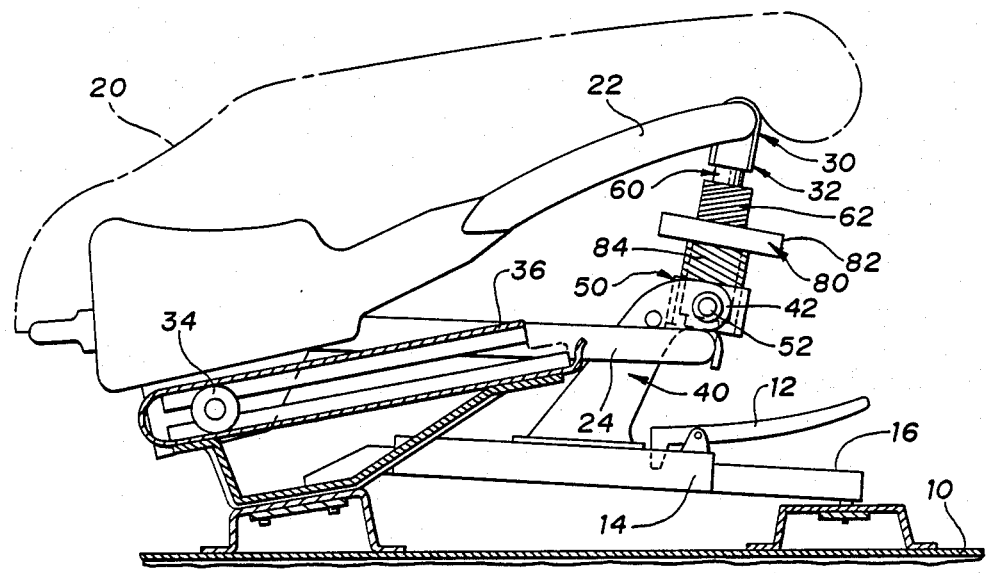
FIG. 3 is a view similar to that of FIG. 2 with the seat elevated.
Figure 4:
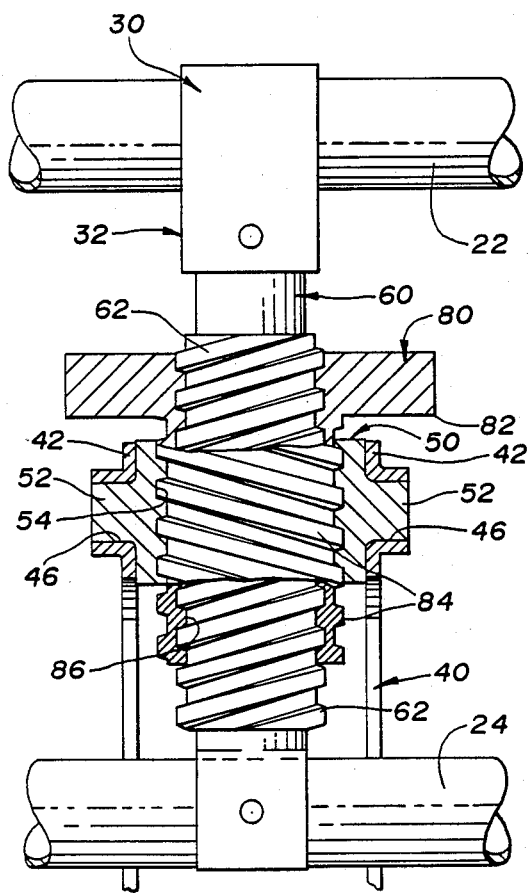
FIG. 4 is a view taken along line 4—4 of FIG. 2.

Referring to FIGS. 1-4, the vehicle 10 has mounted therein a vehicle seat 20 on tri-mount seat vertical adjuster 30. A hand operated latch 12 mechanism on a center upper channel 14 towards the front of the vehicle seat 20 sets the position of the vehicle seat (via upper channel 14) fore and aft within the vehicle (via lower channel 16) by selectively engaging with one of a series of notches in lower channel 16 (not shown). Towards the front of the vehicle seat 20 and connected with an upper 22 and lower 24 seat frame members is an adjustment mechanism 32 to vertically set the elevation of the vehicle seat 20.

The frame vehicle seat 20 is pivotally mounted with respect to the vehicle 10 towards the rearward end via rotatively connected rollers 34. Rollers 34 are captured by and travel within side channels 36.

Fixed vertically with respect to the vehicle 10 is the adjuster support 40. The support 40 has means of connection with the vehicle via the upper 14 and lower 16 channels. The support 40 has two generally laterally projecting ears 42 at its upper end.

Pivotally connected with respect to the support 40 between the ears 42 is a sleeve 50. The sleeve is pivotally connected with the support by studs or axles 52 which project into flared apertures 46 of the support 40. The sleeve has interior threads 54 and as illustrated in FIGS. 1-4 looking downward, has threads with a left hand orientation typically with a thread helix angle of approximately 6° plus or minus 2°.

Projecting through the sleeve 50 is an exterior threaded rod 60. The rod has threads 62 of opposite hand to the threads of the sleeve 50 at a thread helix angle of approximately 6° plus or minus 2°. The top and bottom of the rod 60 are rigidly connected with the upper 22 and lower 24 frame members of the seat 20. In alternative embodiments the rod 60 also may have projecting therethrough a bolt which is fixably connected with both the upper 22 and lower 24 frame members.

Interposed between the rod 60 and the sleeve 50 is a cylindrical knob 80. The knob has an upper portion 82 allowing it to be gripped by a seat occupant. The knob has exterior threads 84 projecting into the sleeve. Knob exterior threads 84 are engaged with the sleeve interior threads 54. The knob 80 also has interior threads 86 which encircle and engage the threads 62 of the rod.

Rotation of the knob 80 causes the knob 80 to have relative linear movement with respect to the sleeve 50 in a first direction. The rotation of knob 80 will also cause the rod 60 to have relative linear movement with respect to knob 80 in the same first direction. The relative movement of the rod 60 and knob 80 act to set the elevation of the seat 20. By virtue of the thread angles the relative linear movement of the rod 60 with respect to the sleeve 50 will be greater than the relative linear movement between the knob 80 and sleeve 50. In other words, the relative linear movement of the rod 60 with respect to the sleeve 50 will be equal to the sum of the relative movements of rod 60 with respect to knob 80 and knob 80 with respect to sleeve 50.

Frictional engagement between the threads of the rod 60, knob 80 and sleeve 50 restrains rotation of the knob 80 therefore maintaining the desired elevation of the seat after rotation by the seat occupant even when the seat 20 is loaded by the occupant.

The seat adjuster 30 provides adjustment in height which is infinitely adjustable between predetermined elevational limits. As the knob 80 is rotated to change the elevation of the seat 20 the sleeve 50 will pivot with respect to the support 40 due to the change in angular orientation of the rod 60 which is fixably connected with the frame members 22 and 24 of the seat 20.

Figure 5:
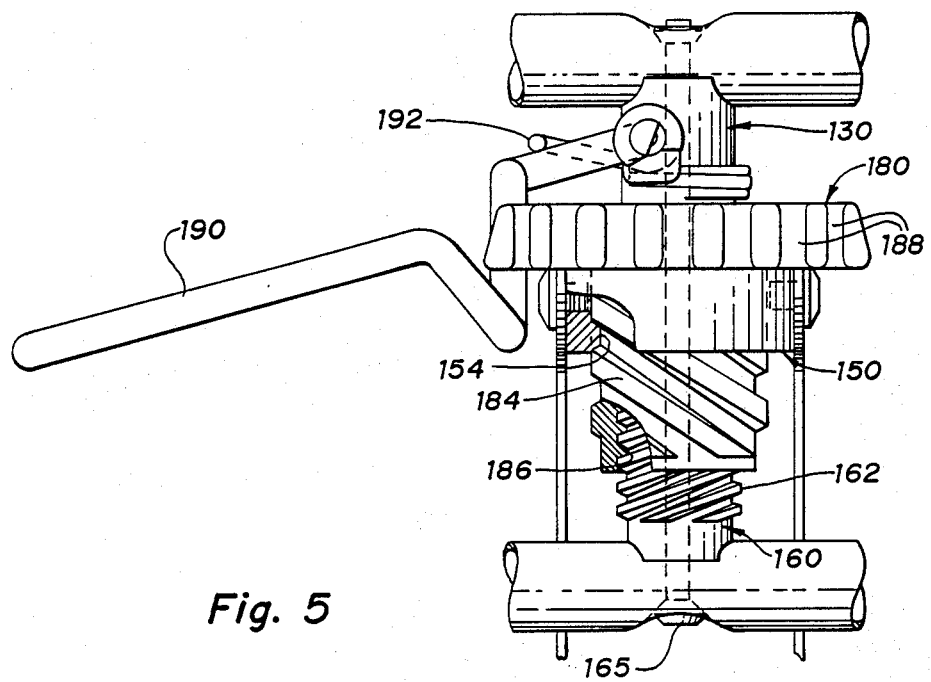
FIGS. 5 and 6 are views of an alternative preferred embodiment of the present invention to that shown in FIGS. 1-4.
Figure 6:
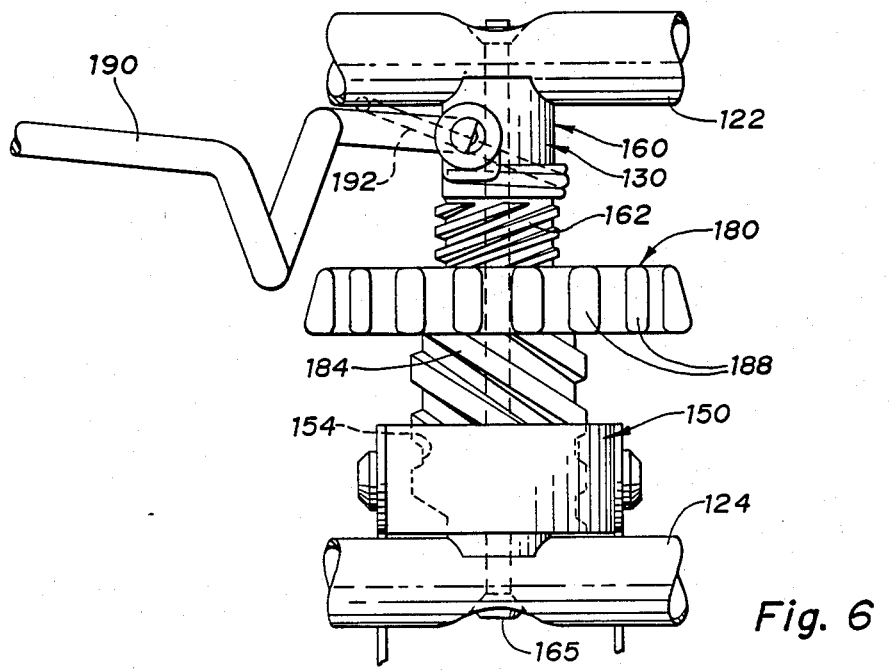

Referring to FIGS. 5 and 6 there is illustrated a portion of an alternative seat adjuster embodiment of the present invention. Seat adjuster 130 is substantially similar to seat adjuster 30 and like parts are given the same reference numeral with a prefix of one.

The rod 160 has exterior thread 162 at a very steep angle having a thread helix angle of approximately 18° (plus or minus 2°), 12° greater than the threads 62 of the previously described rod 60. Because of the steepness of the exterior threads 162 the knob 180 may freely rotate up and down on the rod 160 when the rod is subjected to an axial force. The knob 180 has an exterior thread 184 with a helix angle of approximately 22° which meshes with the threads 154 of sleeve 150 and interior threads 186 which encircle and engage the threads 162 of rod 130. As before, the relative linear movement of rod 160 with resect to sleeve 150 is equal to the sum of the respective movement of the rob 160 with respect to knob 180 and knob 180 with respect to sleeve 150. Therefore to enable the seat to hold its set elevational position, there must be provided some type of brake means to restrain rotation of the knob 180.

The knob 180 has a series of slots 188. The adjuster 130 is connected with the seat frame members 122 as shown in FIGS. 5 and 6 with the rod 160 and a bolt 165. A handle 190, connected with the seat, is biased by a spring 192 to engage with one of slots 188 of the knob 180.

In operation the handle 190 is selectively pulled by the seat occupant. The seat occupant then pivots rearwardly or forwardly to position the seat 20 at the desired elevation. The handle 190 is then operably released to a position to engage with the slots 188 of knob and therefore hold the desired elevation of the seat 20. An advantage of this alternative embodiment is that the operator does not have to rotate the knob. Adjustment is made by simply pulling to release the handle 190 from engagement with the knob slots 188 and pivoting the seat 20.

The present invention provides a method of adjusting a seat which includes the following steps.

1. Pivotally mounting an interior threaded 54 sleeve 50 with a support 40 vertically fixed with respect to the vehicle 10;

2. Projecting through the sleeve 50 an exterior threaded rod 60 having threads 62 opposite the sleeve threads 54;

3. Connecting the threaded rod 60 with the vehicle seat 20;

4. Encircling the rod 60 with a threadably engaged knob 80 and projecting into the sleeve 50 the knob 80 and engaging exterior threads 84 of the knob 80 with the sleeve 50 whereby rotation of the knob 80 causes the knob 80 to have relative linear movement with the sleeve 50 in a first direction and causes the rod 60 to have relative linear movement with the knob 80 in the first direction to set the elevation of the seat 20.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle manual seat adjuster for setting the elevation of a vehicle seat pivotally mounted with respect to said vehicle, said adjuster in combination comprising:
    a support vertically fixed with respect to said vehicle with means of connection with said vehicle;
    an interior threaded sleeve pivotally connected to said support;
    an exterior threaded rod with threads of an opposite hand of said sleeve threads, said rod being fixably connected with said seat and projecting through said sleeve; and
    a knob having interior threads encircling and engaged with said rod and said knob having exterior threads projecting into and engaged with said sleeve whereby rotation of said knob causes said knob to have relative linear movement with respect to said sleeve in a first direction and causes said rod to have relative linear movement with respect to said knob in said first direction to set the elevation of said seat.

2. A seat adjuster as described in claim 1 wherein the frictional engagement of said rod, knob, and sleeve threads prevent said knob from rotating in a free state.

3. A seat adjuster as described in claim 1 further including brake means to restrain said knob from rotating in the free state.

4. An adjuster as described in claim 3 wherein said knob has a series of slots and wherein said adjuster has a biased handle fitting within said slots which may be selectively activated to a position to allow said knob to freely rotate to adjust the elevation of said seat.

5. A seat adjuster as described in claim 1 wherein the angle of said rod threads is between 4° and 8° and the angle of said knob exterior threads is between 4° and 8°.

6. A vehicle manual seat adjuster for setting the elevation of a tri-mount vehicle seat pivotally mounted with respect to said vehicle, said adjuster in combination comprising:
    a support vertically fixed with respect to said vehicle with means of connection with said vehicle;
    an interior threaded sleeve pivotally connected to said support;
    an exterior threaded rod with threads of an opposite hand of said sleeve threads at an angle between 16° and 20°, said rod being fixably connected with said seat and said rod projecting through said sleeve;
    a knob having interior threads encircling and engaged with said rod and said knob having exterior threads at an angle between 20° and 24° projecting into and engaged with said sleeve allowing said knob to freely rotate when said rod is acted upon by an axial force, and said knob having a portion with a series of slots; and
    a handle biased into a position of engagement with said slots of said knob and being selectively operable to a position of nonengagement with said knob whereby said handle in a nonengaging position allows said knob to rotate and to have relative linear movement with said sleeve in a first direction and to case said rod to have relative linear movement with said knob in said first direction to set the elevation of said seat and said handle in an engaging position with said knob prevents rotation of said knob thereby holding the desired elevation of said seat.

7. A method of setting the elevation of a vehicle seat pivotally mounted with respect to said vehicle, said method in combination comprising:
    pivotally mounting an interior threaded sleeve with a support vertically fixed with respect to the vehicle;
    projecting through said sleeve an exterior threaded rod having threads opposite said sleeve threads;
    fixably connecting said threaded rod with said vehicle seat;
    encircling said rod with a threadably engaged knob and projecting into said sleeve said knob and engaging exterior threads of said knob with said sleeve whereby rotation of said knob causes said knob to have relative linear movement with said sleeve in a first direction and causes said rod to have relative linear movement with said knob in said first direction to set the elevation of said seat.

* * * * *